United States Patent [19]

Diehl

[11] Patent Number: 5,508,910
[45] Date of Patent: Apr. 16, 1996

[54] REDUNDANT ANALOG I/O BOARD SYSTEM

[75] Inventor: Robert L. Diehl, Garland, Tex.

[73] Assignee: Forney International, Inc., Carrollton, Tex.

[21] Appl. No.: 312,070

[22] Filed: Sep. 26, 1994

[51] Int. Cl.⁶ .............................. G06F 19/00; G06F 11/16
[52] U.S. Cl. ................ 364/187; 395/182.05; 395/185.09
[58] Field of Search ..................................... 364/184–187, 364/131–136; 371/8.1, 9.1; 395/575, 182.03, 182.04, 182.05, 182.19, 185.09

[56] References Cited

U.S. PATENT DOCUMENTS

| | | | |
|---|---|---|---|
| 4,600,870 | 7/1986 | Martin | 364/162 X |
| 4,639,852 | 1/1987 | Motomiya | 364/187 X |
| 4,868,826 | 9/1989 | Smith et al. | 364/187 |
| 5,249,140 | 9/1993 | Kesler | 364/131 X |
| 5,285,381 | 2/1994 | Iskarous et al. | 364/184 X |

Primary Examiner—Joseph Ruggiero
Attorney, Agent, or Firm—Lane, Aitken & McCann

[57] ABSTRACT

In a distributed logic control system, two duplicate analog I/O boards are provided to provide redundancy for the analog I/O boards. The analog I/O boards serve the function of applying analog output signals corresponding to received digital signals from a data processor to analog signal responsive units. Each analog I/O board has a microprocessor and two digital-to-analog converters and a analog-to-digital converter. The microcomputer determines whether the analog output signals generated by the digital-to-analog converters are within limits and, if they are not, it generates a fail signal applied to a programmable array logic circuit. Each analog I/O board includes a watch dog timer to indicate the sanity of the analog I/O board. The programmable array logic circuits respond to the failure conditions indicated by the watch dog timer and the microcomputer to select one of the analog I/O boards to be the operating analog I/O board to provide analog signals to analog signal responsive units.

6 Claims, 4 Drawing Sheets

REDUNDANT ANALOG I/O BOARD SYSTEM

This invention relates to industrial control systems and, more particularly, to an industrial control system with a redundant analog input/output board.

BACKGROUND OF THE INVENTION

In large, complex industrial control systems, it has been the practice to provide redundancy in various components of the system so that failure of one component of the system will not result in failure of the system. For example, redundancy has been provided in transmission lines, and in data processors. The present invention is directed to an improved system for providing redundancy for what is known as an analog input/output board wherein the analog I/O board receives from a data processor digital signals representing analog values to control an analog signal responsive unit such as a valve or a motor speed setting. In addition, the analog I/O board receives analog input signals and converts the analog input signals to digital values which are transmitted back to the data processor.

In prior art systems, redundancy has been provided for analog-to-digital converters, but the systems of the prior art were simplistic in nature and the switching to a redundant analog-to-digital converter was carried out under the control of the data processor or solely in response to a condition wherein the analog-to-digital converter currently operating failed to provide an operating signal accurately tracking the digital input.

SUMMARY OF THE INVENTION

In the system of the present invention, the redundancy is provided in an analog I/O board which provides a plurality of analog signal outputs and also receives analog signal inputs. Each analog I/O board contains a microcomputer which receives digital data from the data processor and applies the digital data to a plurality of digital-to-analog converters. The analog I/O boards, in addition to monitoring the accuracy of the analog output signal from each digital-to-analog converter, also each include a watch dog timer monitoring the sanity of the analog I/O board. One of the analog I/O boards will be the operating board and apply analog signals to analog signal responsive units and the other analog I/O board will be non-operating. In accordance with the invention, if the analog output signal from one of the digital-to-analog converters does not accurately track the digital value received from the data processor or if the watch dog timer times out on the operating analog I/O board, the non-operating analog I/O board will become operating and substitute itself for the analog I/O board which had the failure. The two analog I/O boards are identical so if the analog I/O board which substituted itself for the original operating I/O board later fails and the original operating I/O board is no longer in a failed condition, then the originally operating analog I/O board will substitute itself for the other analog I/O board and again take over operations of the system. If one of the analog I/O boards becomes insane as indicated by the watch dog timer timing out, and the other analog I/O board fails because one of its D-to-A converters fails to accurately track the digital input signal, then the analog I/O board which is still sane, but which has the non-defective analog-to-digital converter, will be selected as the operating analog I/O board.

Each analog I/O board has a single A-to-D converter to receive the output signals from analog signal sources. This same analog-to-digital converter is also used to monitor the value of the output analog signals from the analog I/O board and transmit digital values back to the microcomputer where the digital value received from the data processor is compared with the digital value representing the analog output signal to determine whether the analog output signal is within the permitted range.

DESCRIPTION OF PREFERRED EMBODIMENTS

Figure 1:
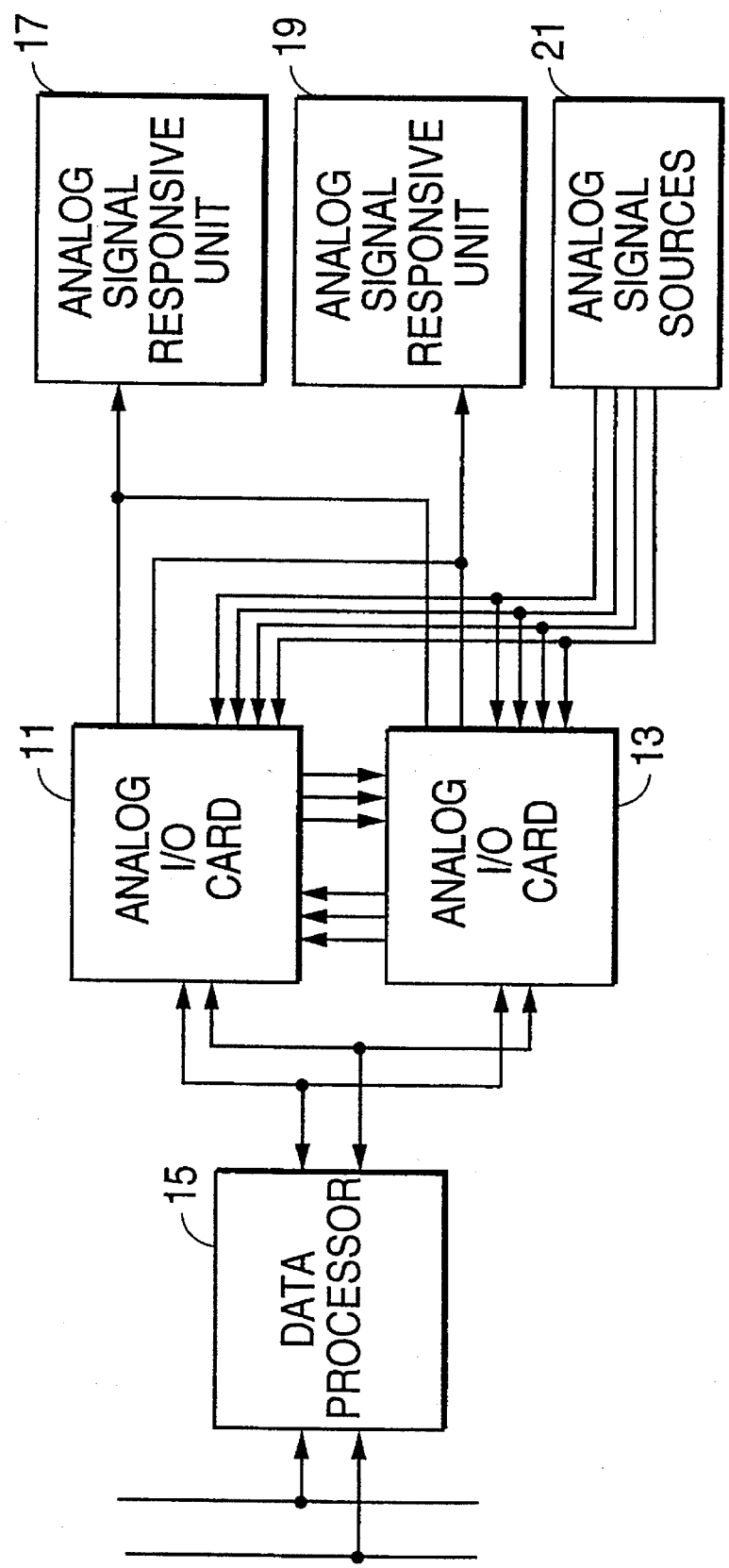
FIG. 1 is a block diagram illustrating the system of the present invention.

As shown in FIG. 1, the system comprises two identical analog I/O boards 11 and 13, which receive and transmit digital signals from a controller 15, which is a data processor. The controller 15 is a remote station in a distributed logic system of an industrial process control system, such as that disclosed in U.S. Pat. No. 4,304,001 to Michael E. Cope issued Dec. 1, 1981. Each analog I/O board 11 and 13 is provided with two digital-to-analog converters which convert digital signals received from the controller 15 into analog signals and applies them to analog signal responsive units 17 and 19, such as a valve having a valve element positioned in accordance with the analog signal or a motor operated at a speed selected by the analog signal. Each of the analog I/O boards are provided with an output relay which is selectively operable to connect the analog signals generated by the two digital-to-analog converters severally to the analog signal responsive units 19 or, alternatively, to resistive loads. One of the analog I/O boards 11 and 13 will be operative and will have its relay actuated to apply its two output analog signals to the analog signal responsive units 17 and 19. The other one of the analog I/O boards will be non-operating and its relay will connect its analog output signals across resistive loads. The controller 15 will apply the same digital values for conversion to analog signals to both analog I/O boards, so that the analog I/O boards should be producing the same analog signals. Each of the analog I/O boards is also provided with an analog-to-digital converter and receives four analog signals from four analog signal sources 21. The analog I/O boards 11 and 13 will each operate to convert the received analog signals to digital values. Each analog I/O board will, on request from the controller 15, transmit the digital signals representing the analog values received from the sources 21 to the controller 15. The analog I/O boards are separately addressable by the controller 15, which may select either analog I/O board to receive digital data representing the analog input signals. The controller 15 will normally select the operating analog I/O board to provide the input data. Each analog I/O board receives signals from the other analog I/O board indicating the operating condition of the other board and when the operating analog I/O board becomes defective, the non-operating I/O board becomes the operating board and vice versa.

Figure 2:
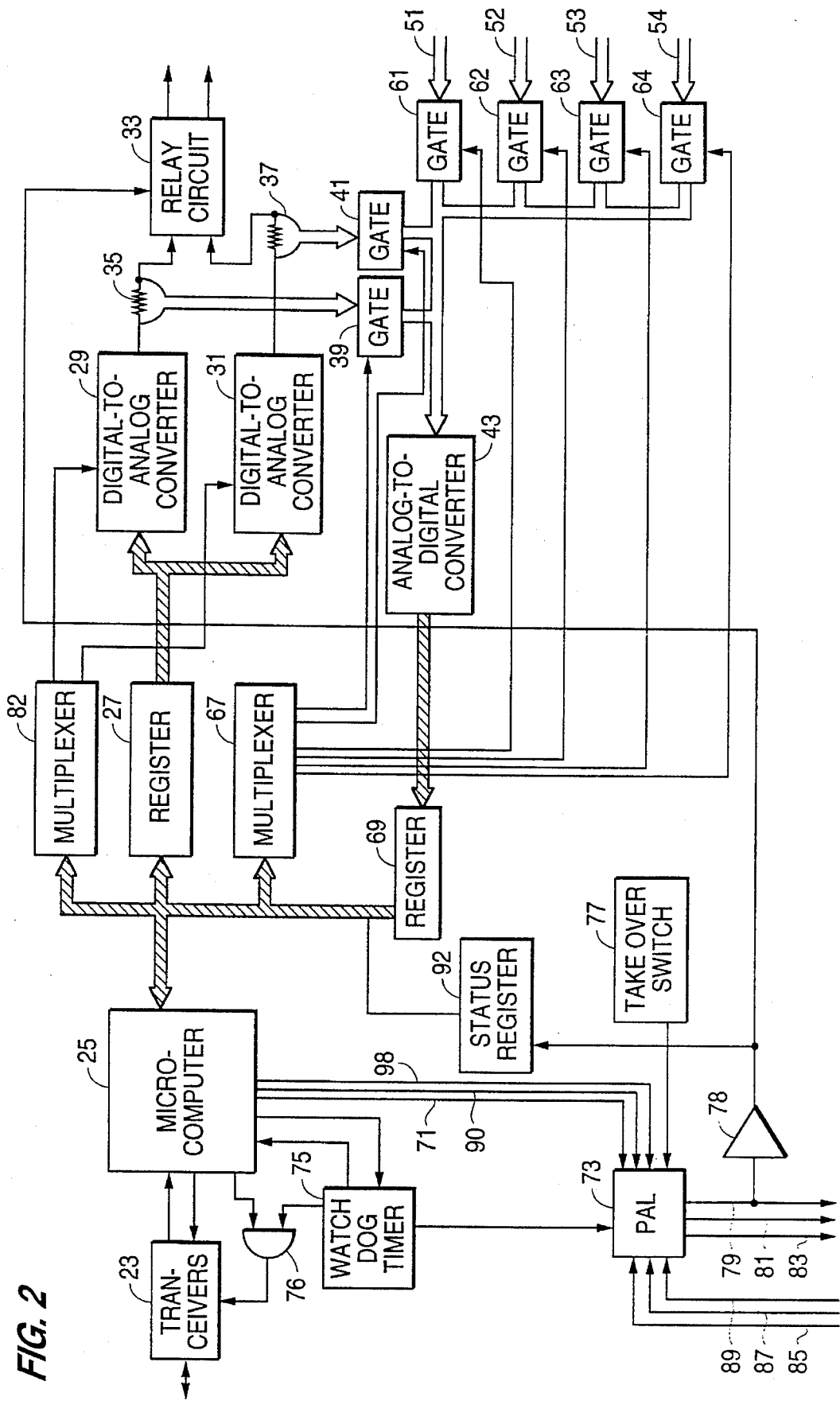
FIG. 2 is a block diagram illustrating the circuitry on an analog I/O board of the system of the present invention.

As shown in the block diagram of FIG. 2, which illustrates the circuit on one of the analog I/O boards, digital signals transmitted serially by the controller 15 are received by transceiver 23, which will transmit the serially received signals to a microcontroller based microcomputer 25. The received signals will include digital values representing analog signals to be applied to one or both of the analog signal responsive units 17 and 19. The microcomputer 25 will apply digital signals representing analog values through register 27 to digital-to-analog converters 29 and 31. The microcomputer 25, by means of multiplexer 32, selects one of the digital-to-analog converters 29 and 31 to generate an analog current signal output corresponding to the digital signal received from the register 27. The selected digital-to-analog converter will apply the output analog signal to a relay circuit 33. When the multiplexer 32 then selects the other digital-to-analog converter to receive and convert the digital output from the register 27, the originally selected digital-to-analog signal will continue to operate its analog output signal level until it is again selected by the multiplexer 32. The relay circuit 33, depending upon whether the analog I/O board is the operating or non-operating board, will apply analog signal currents received from the digital-to-analog converters to the analog signal responsive units 17 and 19, respectively, or will apply the received signal currents across load resistors. The D-to-A converter 29 applies its analog signal current to the relay circuit 33 through a resistor 35 and the D-to-A converter 31 applies its output analog signal current to the circuit 33 through a resistor 37. The resistors 35 and 37 will thus develop analog signal voltages corresponding to the analog signal currents generated by the D-to-A converters 29 and 31. These signal voltages are applied through analog gates 39 and 41, respectively, to an analog-to-digital converter 43.

As pointed out above, the circuit of the analog I/O board is designed to receive analog signals from four analog signal sources and these received signals are received by the analog I/O board on input channels 51–54. The received analog signals on channels 51–54 are applied through analog gates 61–64 to the analog-to-digital converter 43. The microcomputer 25 controls a multiplexer 67 to select one of the analog gates 39, 41, 61, 62, 63 or 64 to be enabled to apply its received analog signal to the A-to-D converter 43. The A-to-D converter will convert the received analog signal to a digital value and store the digital value in a register 69 from which the digital value is transmitted and processed by the microcomputer 25.

In normal operation, the microcomputer 25 will control the multiplexer 67 to sequentially sample the analog signals on input channels 51–54 as well as the signal voltage to generate it across the resistors 35 and 37. The digital values representing the signals received on channels 51–54 can be serially transmitted by the microcomputer 25 via the transceiver 23 over the connecting signal channel to the controller 15.

The microcomputer 25 is programmed to compare the digital values representing the signal voltages generated across the resistors 35 and 37 with the corresponding digital values received from the controller 15 and applied to the digital and analog converters 29 and 31. If the received digital value representing the signal voltage across the resistor 35 or 37 is not within a predetermined range of the corresponding digital signal received from the controller 15, the corresponding analog output signal is considered defective and the microcomputer 25 will generate an analog fail signal on channel 71, which is applied to a programmable array logic circuit or PAL 73 indicating that at least one of the analog output signals is defective.

Each analog I/O board is provided with a watch dog timer 75 which is strobed periodically by the microcomputer 25. If the watch dog timer 75 fails to receive a strobe within 95 milliseconds of the preceding strobe, the watch dog timer 75 will time out and reset the microprocessor to cause it to cease further operations and also to disable further transmissions to the controller 15 by disabling the transceivers 23 via gate 76. Failure of the microcontroller to strobe the watch dog timer 75 is a serious condition indicating that an on-board failure preventing the analog I/O board from acquiring data or safely communicating with the controller 15. Thus, when this condition occurs, the watch dog timer times out and disables the microcontroller 25. In this condition, the analog I/O board is considered "insane". When the watchdog timer times out, it also applies a signal to the PAL 73 indicating the insanity of the analog I/O board.

When both analog I/O boards are sane and both analog I/O boards are producing an analog output signal with an accuracy within the permitted tolerances determined by the microcomputer 25, then the analog I/O board which is currently operating will remain operating and the other analog I/O board which is in an non-operating state will remain non-operative. Each analog I/O board is provided with a takeover switch 77 which, when actuated, will apply a signal to the PAL 73. In response to this switch being actuated on the analog I/O board which is in an non-operative state, the operating analog I/O board will become non-operating and the non-operating analog I/O board will become operating. The PAL 73 provides a signal on channel 79 which controls whether the analog I/O board is operating or non-operating. If the analog I/O board is operating, the signal on channel 79 will be low representing binary zero. The signal on channel 79 is inverted by an inverter 78 and applied to the relay circuit 33 to cause it to be actuated and take over operations when the signal on channel 79 is low and to be deactuated when the signal on channel 79 is high.

The output signal on channel 79 is also applied to the other analog I/O board. The analog I/O board thus transmits a signal to the other analog I/O board indicating whether the first mentioned analog I/O board is in an operating or non-operating state. The PAL 73 applies signals on two output channels 81 and 83, which indicate the sanity of the analog I/O board as indicated by the signal received by the PAL 73 from the watch dog timer and whether or not one of the analog output signals is defective as indicated by the analog fail signal on channel 71. The PAL 73 will receive these same two signals from the other analog I/O board over input channels 85 and 89 and will receive a signal over input channel 87 from the output channel 79 from the other board indicating the operating or non-operating status of the other board.

The PAL 73 also sets a bit in a status register 92 to indicate the operating or non-operating state of the analog I/O board. The microcomputer 25 monitors the state of this bit and will transmit data indicating the operating or non-operating state of the analog I/O board to the controller 15. The controller 15 uses this information to select the operating analog I/O board to receive the values of the analog input signals received by the analog I/O boards.

If the non-operating I/O board is healthy, meaning that it is sane and its analog output signals are within limits, and the PAL 73 of the non-operating analog I/O board receives signals on channels 85, 87 and 89 indicating that the operating analog I/O board has become insane or is generating an analog fail signal, the PAL 73 on the non-operating board will switch the non-operating analog I/O board to an operating state by switching the output signal on channel 79 from binary one to binary zero and the PAL 73 on the operating analog I/O board will switch that analog I/O board to a non-operating state.

The table below indicates what is meant by the combination of the three output signals applied to the other board on channels 79, 81 and 83.

TABLE

| Output channels | | | |
|---|---|---|---|
| 79 | 81 | 83 | Status |
| 0 | 0 | 0 | Operating, sane, AO signals OK |
| 0 | 0 | 1 | Operating, sane, AO signal defective |
| 0 | 1 | 0 | Operating, insane |
| 0 | 1 | 1 | Operating, takeover switch actuated |
| 1 | 0 | 0 | Non-operating, sane, AO signals OK |
| 1 | 0 | 1 | Non-operating, takeover switch actuated |
| 1 | 1 | 0 | Non-operating, insane |
| 1 | 1 | 1 | Non-operating, sane, AO signal defective |

As indicated in this table, a zero output signal on channel 79 will indicate that the analog I/O board currently is in an operating state and has control. Signals representing binary zero on both of the channels 81 and 83 will represent that the analog I/O board is sane and that its analog output signals are not defective. If the analog I/O board has control as indicated by a zero signal on channel 79 and the signal on channel 81 is zero and the signal on channel 83 is one, this means that the analog I/O board is sane, but one of its analog output signals is defective. If the analog I/O board has control as indicated by a binary zero signal on channel 79 and a binary one is on channel 81 and a binary zero is produced on channel 83, this will mean that the analog I/O board is insane. If the signal on channel 79 is low meaning that the analog I/O board has control and, at the same time, the takeover switch button 77 is actuated, then the PAL will produce binary one's on both output channels 81 and 83.

If the output signal on channel 79 is high so that the relay circuit 33 is deactuated and so that the analog I/O board is in a non-operating state, then if the takeover switch 77 is actuated, the PAL will produce a binary zero on channel 81 and a binary one output signal on channel 83. If the analog I/O board is non-operating whereby the PAL produces a high output signal on channel 79 and the analog I/O board is insane, the PAL 73 will produce a binary one on channel 81 and a binary zero or low output on channel 83. If the PAL 73 produces a binary one on channel 79 indicating that the analog I/O board is non-operating and the analog I/O board is sane but an analog output signal is defective, then the PAL 73 will produce binary ones on both channels 81 and 83.

The PAL 73 sets the signal on channel 79 to be high or low depending on the sanity output signal received from the watch dog timer and the analog fail signal received on channel 71 from the microcomputer 75 indicating whether or not the analog I/O signals have an accuracy within the permitted limits and the state of the signals received from the other analog I/O board on channels 85, 87 or 89, and also depending upon additional signals from the microcomputer 25, as will be later explained.

When the analog I/O board is the non-operating board so that the relay circuit 33 is de-actuated and the output signal on channel 79 is high, the PAL 73 will switch the output signal to low to cause the relay circuit 33 to be actuated and to cause the analog I/O board to take control if the signal on the channel 79 on the operating analog I/O board changes from low to high as indicated by the signal received by the PAL 73 on channel 85. In addition, the PAL will switch the output channel on channel 79 to low to cause the analog I/O board to take control if the takeover switch 77 is actuated unless the takeover switch on the operating analog I/O board is also being depressed as indicated by high level signals received on input channels 87 and 89. The PAL 73 will switch the output signal on channel 79 to a low level to cause the non-operating I/O board to take control if the board is healthy as indicated by the output signal from the watch dog timer 75 and the output signal from the microcomputer 25 on channel 71 and the operating board is producing a defective analog output signal. This condition of the operating analog I/O board will be indicated by high level signals received on channel 87 and a low level signal received on channel 89 of the non-operating board. When the non-operating analog I/O board is sane and the operating analog I/O board is insane as indicated by a high level signal received on channel 87 and a low level signal received on channel 89, the PAL 73 on the non-operating board will switch the output signal on channel 79 to a low level to cause this analog I/O board to take control. This switchover will take place whether or not the analog output signals from the non-operating analog I/O board are defective. The PAL 73 on the operating analog I/O board will switch its board to a non-operating state whenever it detects that the PAL on the non-operating board has switched its board to an operating state.

The PAL 73 can also receive an additional signal on channel 90 from the microcomputer 25 called a disable signal to indicate a special condition which occurs when analog signal responsive device is disconnected from the analog I/O boards. Under these conditions, when an analog I/O board has control and is attempting to apply an analog signal to the disconnected analog signal responsive device, the analog output signal will no longer be within the prescribed limits because the analog output signal current will be interrupted. This condition could cause the relay circuit 33 to become de-energized and cause the non-operating analog I/O board I/O board to take control. As a result, the relay circuit 33 will switch resistors across the analog output channels. This action in turn would normally cause the analog output signal to come back within limits so that the microcomputer 25 will no longer detect that the analog output signal is defective. The formerly non-operating analog I/O board upon having its relay circuit 33 actuated to take control would also detect the analog output signal as being defective because of the disconnection of the analog signal responsive device. This detection would then cause the originally operating analog I/O board to again take control. To prevent this cycling back and forth between analog I/O boards upon the occurrence of the disconnection of an analog signal responsive device, the microcomputer 25 is programmed to detect the condition when the analog output signal was defective and then comes back within the limits upon the analog I/O board giving up control by the relay circuit 33 being de-actuated. When this condition occurs, the microcomputer 25 applies a disable signal indicative of this fact over channel 90 to the PAL 73. The disable signal on channel 90 prevents the PAL 73 on the non-operating analog I/O board from switching the board to operating in response to signals from the operating analog I/O board indicating that the operating analog I/O board is generating an analog fail signal.

When the disconnected analog signal responsive device is reconnected, the microcomputer 25 on the operating analog I/O board will detect that the analog output signal is no longer defective. In order to clear the disable signal on channel 90 of the non-operating board, the microcomputer on the operating board, in response to detecting the change in the analog output signal from defective to non-defective, will apply a failover signal to the PAL 73 on the operating board over channel 98 to cause the PAL 73 to switch the operating board to non-operating. This change of state of the operating board will be detected by the PAL on the non-operating board, which will then switch the non-operating board to operating. The switching of the non-operating board to operating will cause the microprocessor 25 on this board to clear its disable signal on channel 90 so that redundant switchover can again take place in response to generation of the analog fail signal on the operating board.

Figure 3:
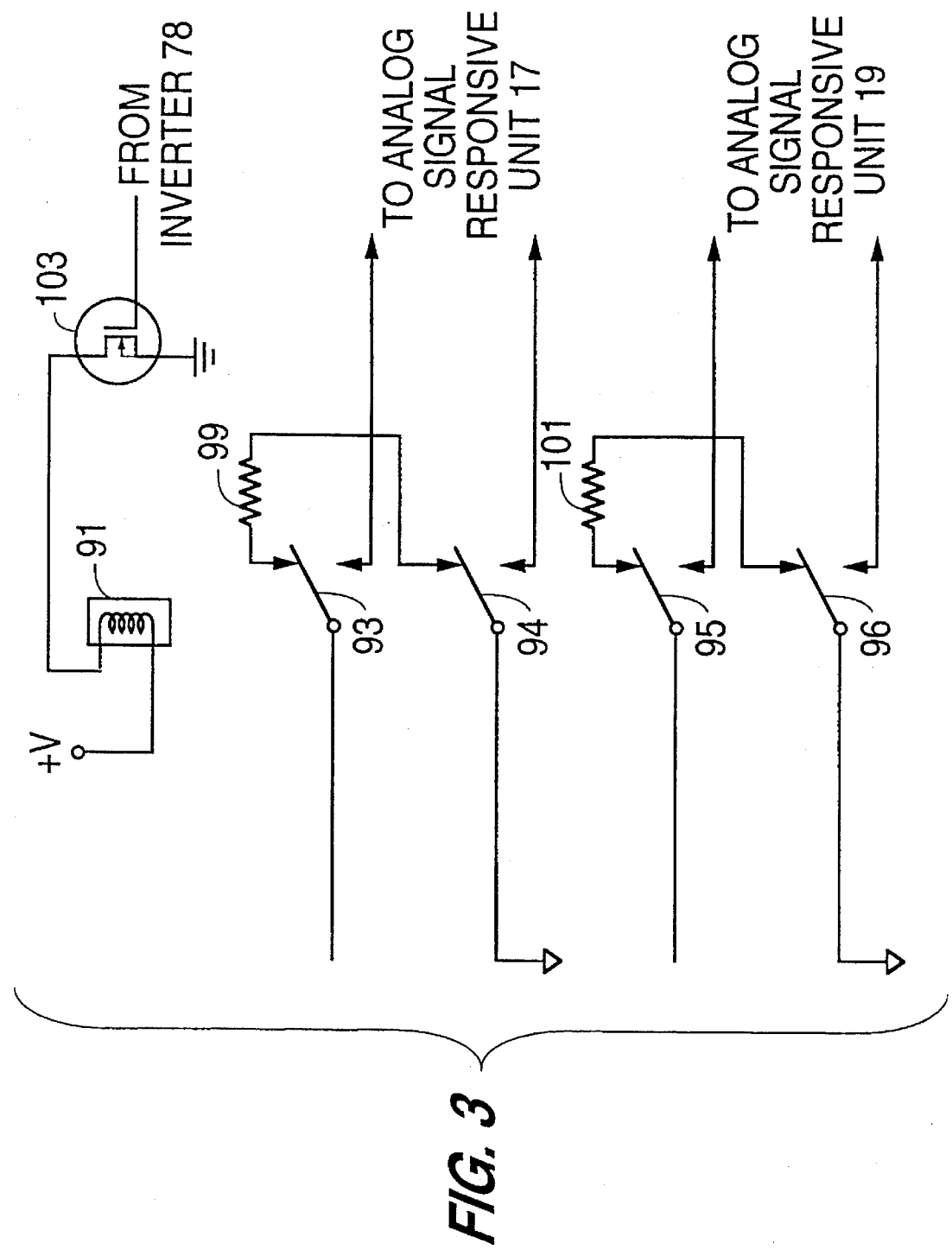
FIG. 3 is a circuit diagram illustrating the relay output circuit employed on the analog I/O board.

As shown in FIG. 3, the relay circuit comprises a relay coil 91 which operates four double throw relay poles 93–96. The analog output current signal from the digital-to-analog converter 29 is applied to the pole 93 and an analog reference voltage called "analog ground" is connected to the pole 94. When the relay 91 is de-energized, the contacts 93 and 94 will connect a load resistor 99 between the output signal line from the analog-to-digital converter 29 and analog ground. When the relay is energized, the contacts 93 and 94 will connect the analog signal and the analog ground reference to output signal lines which connect to the analog signal responsive device 17. The analog output current signal from the digital-to-analog converter 31 is connected to the pole 95 and the pole 96 is connected to analog ground. When the relay coil 91 is de-energized, the contacts 95 and 96 will connect a resistor between the output signal line from the digital-to-analog converter 31 and analog ground. When the relay coil 91 is energized, the analog output signal and analog ground will be connected to output lines connected to the analog signal responsive unit 19. The energization of the relay coil 91 is controlled by means of a field effect transistor 103. When the PAL 73 determines that the analog I/O board should be the operating analog I/O board, the low level output signal on channel 79 causes the inverter 78 to apply a high signal to the gate of the field effect transistor 103 to render it conductive and energize the relay coil 91. When the PAL 73 determines that the analog signal board should be inoperative, it causes a low level signal to be applied to the field effect transistor 103 by the inverter 78 to render the field effect transistor 103 nonconductive and de-energize the relay 91 so that the analog current signals are connected pass through the load resistors 99 and 101.

Figure 4:
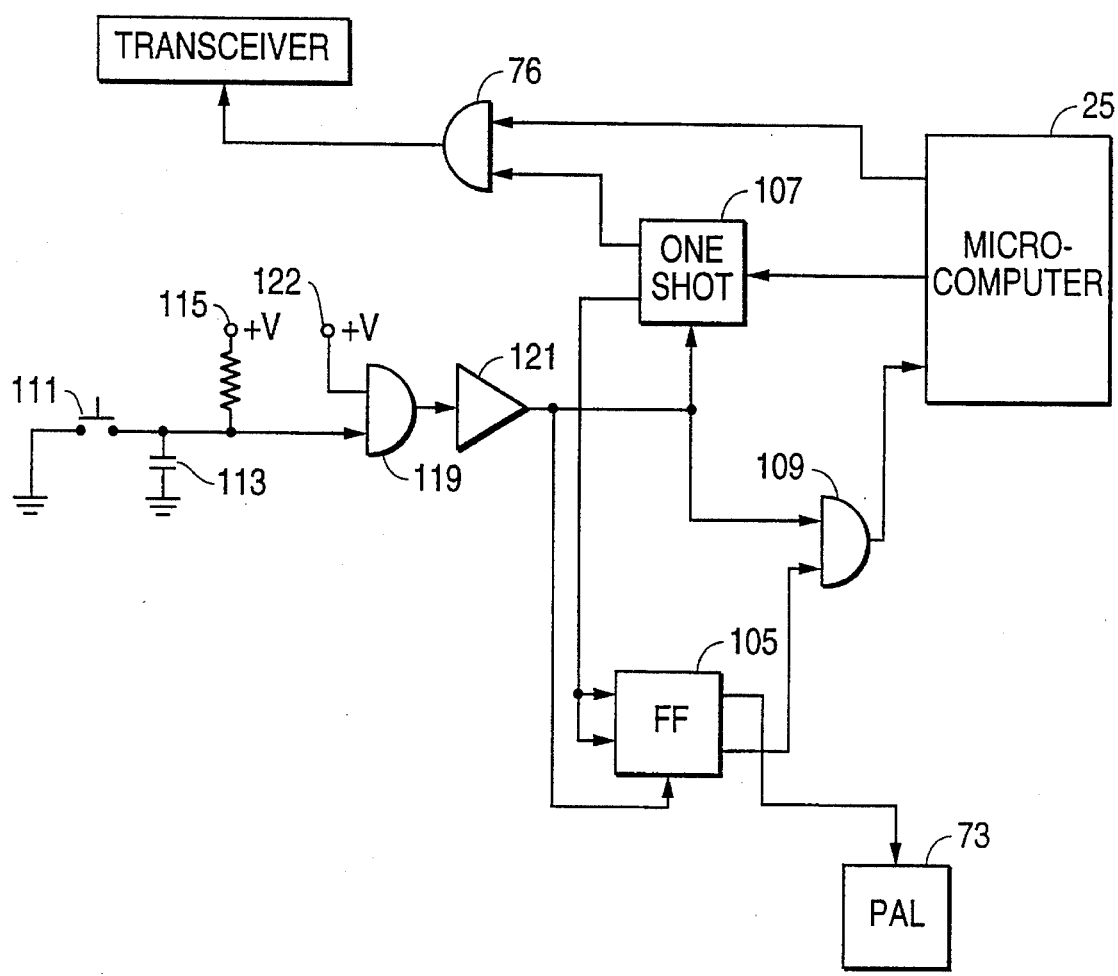
FIG. 4 is a circuit diagram of the watch dog timer and reset circuit employed in the circuitry of the analog I/O board.

As shown in FIG. 4, the watch dog timer circuit 75 includes a flip-flop 105 and one-shot multivibrator 107. The one-shot 107 is periodically strobed by the microcomputer 25 when the microcomputer is in an operating state. As long as the one-shot 107 receives a strobe within 95 milliseconds of its previous strobe, it will remain in its triggered state and enable the gate 76 to allow the microcomputer to apply an enabling signal through the gate 76 to the transceiver 23. Should the one-shot 107 not receive a strobe from the microcomputer 25 within 95 milliseconds, it will time out and clear the flip-flop 105. When the flip-flop 105 is cleared by the output from the one-shot 107, it will apply a signal through a gate 109 to the microcomputer 25 to disable the microcomputer from further operations. The state of the flip-flop 105 indicates whether or not the analog I/O board is sane or insane and the flip-flop 105 also applies a signal to the PAL 73 indicating the sane or insane condition of the analog I/O board. Once the microprocessor 25 is disabled, it will remain disabled until it is reset by the actuation of a reset switch 111. When the reset switch 111 is actuated, it will discharge a capacitor 113 which will then begin the charge from a positive power source applied at terminal 115 through a resistor 117. The voltage across the capacitor 113 is applied to the input of a Schmidt trigger NAND gate 119, which operates as an inverter and will produce a high voltage output signal when the voltage on the capacitor 113 is low. The high voltage output signal from the NAND gate 119 is inverted by an invertor 121 and applied to the one-shot 107 to prevent the one-shot 107 from being triggered and also is applied to the flip-flop 105 to maintain the flip-flop 105 cleared. The low output signal voltage from the inverter 121 is also applied to the gate 109. The gate 109 will apply a high voltage to the computer 25 to maintain the computer 25 in an inoperative state whenever the voltage applied to the gate 109 from either the flip-flop 105 or from the inverter 121 is low. When the capacitor 113 charges up to a sufficiently high value to exceed the voltage applied to the gate 119 from terminal 122, this action will trigger the Schmidt-trigger NAND gate 119 and cause the output of the inverter 121 to go high. The high output voltage from the inverter 121 is applied to the one-shot 107 to enable it to be triggered by a strobe from the microcomputer and will also set the flip-flop 105 in a set or operating state. As a result, both inputs to the gate 109 will be high and cause the gate 109 to apply a low signal voltage to the microcomputer 25 and enable the microcomputer 25 to begin operation and begin strobing the one-shot 107. The one-shot 107 will enable gate 76 and allow the microcomputer to enable the transceivers 23. The switching of the flip-flop 105 to its set or operating state will cause the flip-flop 105 to apply a signal of the PAL 73 indicating that the analog I/O board is now sane.

The system as described above provides a redundancy for analog I/O boards which both compare digital signals to analog values to be transmitted to analog signal responsive units as well as receive signals from analog signal sources which are converted to digital on the analog I/O board and transmitted back to a controller. The boards provide a fail over to the redundant board upon failure of either a watch dog timer or a failure to accurately convert received digital signals to analog values. Moreover, the system provides for selecting which board shall be the primary board when failure in the watch dog timer occurs on one of the boards and analog output signal accuracy failure occurs on the other board.

The above description is of a preferred embodiment of the invention and modification may be made thereto without departing from the spirit and scope of the invention which is defined in the appended claims.

I claim:

1. A digitally responsive analog control system comprising a data processor, first and second analog I/O boards connected to receive digital signals representing analog values from said data processor, an analog signal responsive unit connected to each of said analog I/O boards for receiving an analog signal from said one of said analog I/O boards, a digital-to-analog converter on each of said analog I/O boards for converting digital signals to analog values, switch means on each of said analog I/O boards applying when enabled the analog signal from the digital-to-analog converter of the corresponding analog I/O board to said analog signal responsive unit and disconnecting when disabled the analog signal of the corresponding analog I/O board from said analog signal responsive unit, a microcomputer on each of said analog I/O boards for applying digital signals received by said analog I/O board to said digital-to-analog converter, a watch dog timer on each of said analog I/O boards to time out and generate an insanity signal if said watch dog timer is not strobed within a predetermined time interval of the preceding strobe of said watch dog timer, said microcomputer on each board comprising means to periodically strobe the watch dog timer on such board, and logic means on said first and second analog I/O boards to place one of said analog I/O boards in a non-operating state by disabling the switch means on said one of said analog I/O boards and to place the other one of said analog I/O boards in an operating state by enabling the switch means on said other one of said analog I/O boards, said logic means being responsive to the insanity signal generated by the watch dog timer on the operating analog I/O board to switch the operating analog I/O board to non-operating and to switch the operating analog I/O board to non-operating.

2. A digitally responsive analog control system as recited in claim 1, wherein each of said analog I/O boards includes an analog-to-digital converter connected to convert the analog output signal from digital-to-analog converter on such analog I/O board to a digital value, said microcomputer on each analog I/O board comprising means to compare the digital value produced by the analog-to-digital converter on such analog I/O board with the corresponding digital signal value applied to the digital-to-analog converter on such analog I/O board and to generate an analog fail signal if the compared digital values differ from each other by more than a predetermined amount, said logic means being responsive to the analog fail signal produced on the operating analog I/O board to switch the operating analog I/O board to non-operating and to switch the non-operating analog I/O board to operating provided that the non-operating I/O board is not producing an insanity signal or an analog fail signal.

3. A digitally responsive analog control system as recited in claim 2, wherein said microcomputer on each analog I/O board comprises means to detect the condition of the analog I/O board ceasing to generate the analog fail signal when such analog I/O board is switched from operating to non-operating and to generate a disable signal indicative of this condition, said logic means being responsive to said disable signal to inhibit switching of the non-operating analog I/O board to operating in response to the generation of an analog fail signal on the operating analog I/O board.

4. A digitally responsive analog control system as recited in claim 2, wherein each of said analog I/O boards comprises means to receive an analog input signal on an analog input channel, said microcomputer on each analog I/O board comprising means to selectively apply the analog signal received on the analog input channel or the analog output signal from the digital-to-analog converter of such analog I/O board to the input of the analog-to-digital converter of such analog I/O board.

5. A digitally responsive analog control system as recited in claim 1, further comprising a second analog signal responsive unit, each of said analog I/O boards having a second digital-to-analog converter, said switch means on each of said analog I/O boards being operable when enabled to apply the output signal from the second digital-to-analog converter on such analog I/O board to said second analog signal responsive unit, said microcomputer on each of said analog I/O boards comprising means to apply a digital signal representing an analog signal to be applied to said second analog signal responsive unit to the input of the second digital-to-analog converter on such analog I/O board.

6. A digitally responsive analog control system as recited in claim 1, wherein each of said analog I/O boards contains a register means responsive to the output of said logic means to store an indication of whether such analog I/O board is in an operating or non-operating state and to provide such indication to the microcomputer on such analog I/O board, the microcomputer on each of said analog I/O boards comprising means to indicate the non-operating or operating state of such analog I/O board to said data processor.

* * * * *